US006675357B1

(12) United States Patent
Carter et al.

(10) Patent No.: US 6,675,357 B1
(45) Date of Patent: Jan. 6, 2004

(54) METHOD AND APPARATUS FOR MATCHING SYSTEM AND DEVICE FONTS

(75) Inventors: Keith Edward Carter, Austin, TX (US); Michael Richard Cooper, Austin, TX (US); David Harvey Fritz, Austin, TX (US); Patrick Edward Nogay, Austin, TX (US); Mark Wayne VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,499

(22) Filed: Jan. 29, 1999

(51) Int. Cl.⁷ .............................................. G06F 15/00
(52) U.S. Cl. ...................... 715/542; 715/500; 345/471
(58) Field of Search .............................. 707/514, 542; 345/467, 471; 358/1.11, 1.18; 715/542, 500

(56) References Cited

U.S. PATENT DOCUMENTS

| | | | | |
|---|---|---|---|---|
| 3,964,591 A | * | 6/1976 | Hill et al. ..................... | 395/110 |
| 4,594,674 A | | 6/1986 | Boulia et al. ................ | 364/523 |
| 4,901,249 A | * | 2/1990 | Shiota ........................ | 395/115 |
| 5,103,303 A | * | 4/1992 | Shoji et al. ................. | 358/500 |
| 5,113,355 A | * | 5/1992 | Nomura ...................... | 358/1.11 |
| 5,257,351 A | * | 10/1993 | Leonard et al. ............. | 707/542 |
| 5,371,888 A | | 12/1994 | Lehnertz et al. ............ | 395/650 |
| 5,506,940 A | | 4/1996 | Bamford et al. ............ | 395/110 |
| 5,528,742 A | * | 6/1996 | Moore et al. ................ | 715/542 |
| 5,577,177 A | | 11/1996 | Collins et al. .............. | 395/169 |
| 5,583,978 A | | 12/1996 | Collins et al. .............. | 395/170 |
| 5,586,241 A | | 12/1996 | Bauermeister et al. ...... | 395/167 |
| 5,592,683 A | | 1/1997 | Chen et al. .................. | 395/872 |
| 5,669,007 A | | 9/1997 | Tateishi ...................... | 395/779 |
| 5,689,723 A | | 11/1997 | Lim et al. ................... | 395/805 |
| 5,757,384 A | | 5/1998 | Ikeda et al. ................. | 345/468 |
| 5,781,714 A | * | 7/1998 | Collins et al. .............. | 345/471 |
| 5,812,734 A | * | 9/1998 | Shimoda et al. ............. | 386/81 |
| 5,825,987 A | * | 10/1998 | Asada ........................ | 358/1.11 |
| 5,877,776 A | * | 3/1999 | Beaman et al. ............. | 345/472 |
| 5,995,718 A | * | 11/1999 | Hiraike et al. .............. | 358/1.11 |
| 6,038,575 A | * | 3/2000 | Jensen et al. ................ | 715/542 |
| 6,138,237 A | * | 10/2000 | Ruben et al. ................ | 713/200 |
| 6,295,538 B1 | * | 9/2001 | Cooper et al. .............. | 707/104 |
| 6,313,920 B1 | * | 11/2001 | Dresevic et al. ........... | 358/1.11 |
| 6,323,864 B1 | * | 11/2001 | Kaul et al. .................. | 345/467 |
| 6,323,865 B1 | * | 11/2001 | Colletti ....................... | 345/467 |
| 6,330,577 B1 | * | 12/2001 | Kim ........................... | 707/542 |
| 6,356,268 B1 | * | 3/2002 | Beaman et al. ............. | 345/467 |
| 6,388,757 B1 | * | 5/2002 | Koga .......................... | 358/1.11 |
| 6,433,884 B1 | * | 8/2002 | Kawakami .................. | 358/1.15 |
| 6,441,918 B1 | * | 8/2002 | Hori ........................... | 358/1.16 |
| 6,445,458 B1 | * | 9/2002 | Focazio et al. ............. | 358/1.11 |
| 6,456,385 B1 | * | 9/2002 | Rolling et al. ............. | 358/1.11 |
| 6,507,407 B1 | * | 1/2003 | Matsumoto ................. | 358/1.11 |
| 6,552,728 B1 | * | 4/2003 | Moore et al. ................ | 345/471 |

FOREIGN PATENT DOCUMENTS

| | | | | |
|---|---|---|---|---|
| EP | 0583548 A1 | 2/1994 | .......... | G06F/15/20 |
| EP | 0632396 A2 | 1/1995 | .......... | G06F/17/21 |
| EP | 0692768 A2 | 1/1996 | .......... | G06K/9/68 |
| JP | 0926864 | 1/1997 | .......... | G06F/3/12 |
| JP | 09193489 | 7/1997 | .......... | B41J/5/44 |

OTHER PUBLICATIONS

IBM Technical Disclosure Bulletin; Protocol for Reliable Printer Sharing Among Multiple Servers; Feb. 1997; vol. 40, No. 2.

Miller, JJH; Protext IV. Proceedings of the Fourth International Conference on Text Processing; Published: Dun Loaghaire, Ireland, 1987, vii+153 pp.

* cited by examiner

*Primary Examiner*—Heather R. Herndon
*Assistant Examiner*—Cong-Lac Huynh
(74) *Attorney, Agent, or Firm*—Duke W. Yee; Jeffrey S. LaBaw; Cathrine K. Kinslow

(57) ABSTRACT

A method and apparatus in a distributed data processing system for controlling printing. An interface is presented, wherein the interface allows for association of a logical font with a number of system fonts on a per printer queue basis. Responsive to a print request, the print request is printed using the system font associated with the logical font for that print request.

12 Claims, 6 Drawing Sheets

METHOD AND APPARATUS FOR MATCHING SYSTEM AND DEVICE FONTS

BACKGROUND OF THE INVENTION

1. Technical Field

The present invention relates generally to an improved data processing system and in particular to a method and apparatus for generating fonts. Still more particularly, the present invention relates to a method and apparatus for controlling printing within a distributed data processing system.

2. Description of Related Art

A font is a set of glyphs having a particular face type, style, and weight. A font consists of all the glyphs available in a particular type and weight for a particular design. Typeface contains the computer definition. Fonts are used by computers for on-screen displays and by printers for hardcopy output. In both cases, the fonts are stored as either bitmaps (patterns of dots) or as outlines (defined by mathematical formulas). Commonly, a font is identified by a basic font name, such as "Courier", "Arial", "Helvetica", or "Times New Roman" which identifies the general shapes of its characters, independent of size. The ability to vary fonts has many advantages. Varying fonts in a document allows a user to vary the size of letters to pack text more densely when necessary and to allow text to be more easily read. Using different fonts provides an ability to visually distinguish different parts of text. Such a variation of fonts can make text easier to scan and use. Further, some texts are more esthetically pleasing than other texts. On the other hand, some texts may be easier to read. Different fonts will appeal to different esthetic senses. Some fonts will appear traditional, others modern, while others may be humorous or shocking. The ability to select from a wide variety of fonts greatly increases the ability to tune the esthetic message of a document.

Most computer systems have the ability to display print text in different fonts. These computer systems typically have font resources, which contain predefined font descriptions for each shape of each character of each of the fonts that the computer can handle.

With respect to printing on distributed data processing systems, client computers may send print jobs to a remote location to produce a hardcopy. In some cases, the client computers may differ in the locale or language. Such a difference between client computers must be resolved at the print server. For example, in Java, a number of different languages or locales may be used. One client computer may use the language English in a United Kingdom locale while another client computer may use Japanese in a Japanese locale. A locale is a region, usually geographic, that shares customs, culture, and language. Locales are supported in Java by Local class. Examples of Locales are en_GB for the country United Kingdom with the language English, en_US for the country United States with the language English, en_CA for the country Canada with the language English, and fr_CA for the country Canada with the language French.

In Java environments, the user is at the whim of the Java Virtual Machine (JVM) and the font.properties file available with Java. The font.properties file, also referred to as the font properties file, is Java's mapping of its logical fonts to platform specific fonts. A logical-font is an arbitrary platform independent font that can be mapped to a physical font with similar characteristics. In Java, examples of logical fonts are courier, dialog, and Times New Roman. Many users are not even aware of the font properties and those that are, are not aware of how the keywords and the JVM interact. In other words, the mapping of logical fonts to real physical fonts is unclear in such a system. As a result, client printing in one language may encounter poor print quality or slow font rendering performance. In addition, printing from a client Java machine in a different locale to a server Java machine is difficult because the font properties between the two will be different.

Therefore it would be advantageous to have an improved method and apparatus for controlling printing within a distributed data processing system.

SUMMARY OF THE INVENTION

The present inventions provides a method and apparatus in a distributed data processing system for controlling printing. An interface is presented, wherein the interface allows for association of a logical font with a number of system fonts or device fonts on a per printer queue basis. Responsive to a print request, the print request is printed using multiple system or device fonts associated with the logical font for that print request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
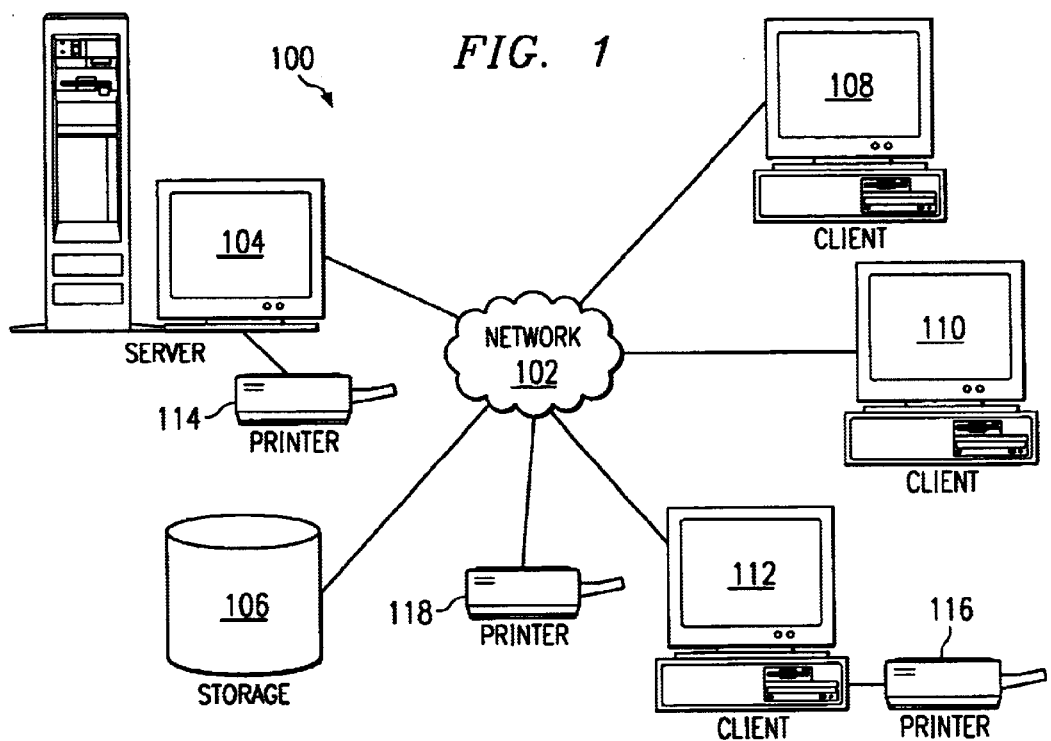
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Printers 114, 116, and 118 also are present within distributed data processing system 100. Printer 114 is attached to server 104 while printer 116 is attached client 112. Printer 118 is a stand alone printer that is attached directly to network 102 and does not require a connection to a computer to process print jobs. Clients 108–112 may send various printer jobs for printing at printer 114 by directing those printer jobs to server 104. Printer 114 may be located remotely from one or more of clients 108–112. If network 102 is a wide area network, printer 114 may be located in another building or floor from the clients. If network 102 is the Internet, printer 114 may be located in another building or even farther in another city from one or more of clients 108–112. Printer 116 is attached to client 112. In this instance, client 112 may print directly to printer 116 or send a print job to printer 114. In addition, in some cases client 112 may act as a printer server depending on how printer 116 is configured for access by other systems. In addition, server 104 also acts as a print server for clients 108–112.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
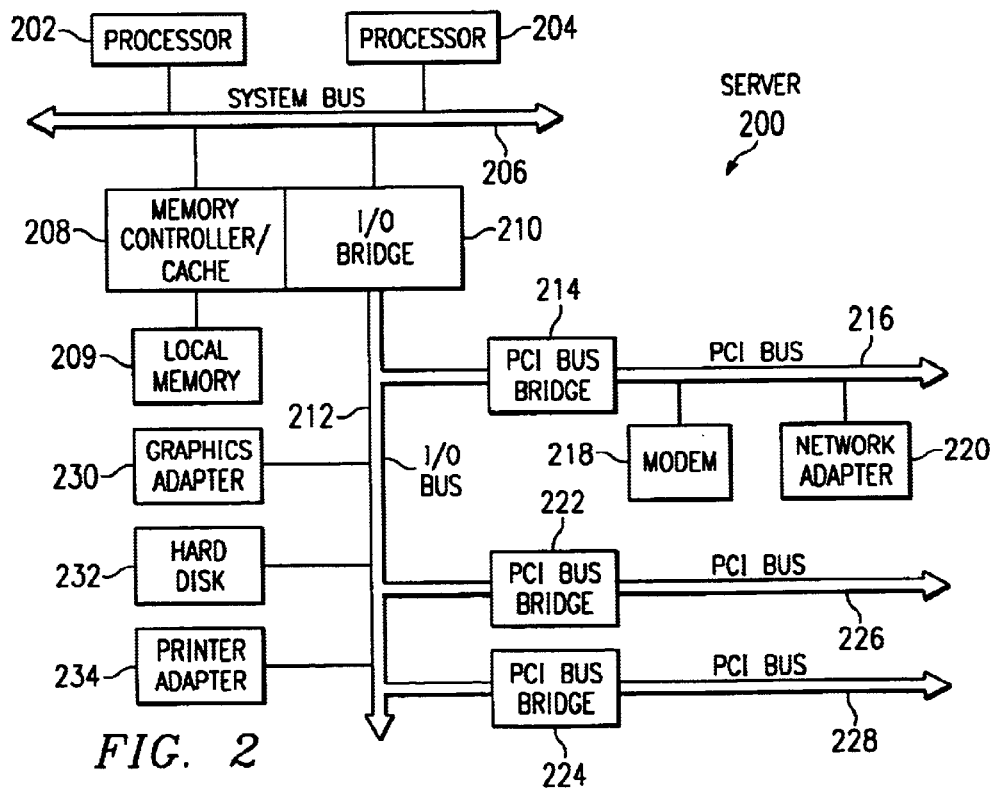
FIG. 2 is a block diagram which depicts a data processing system in accordance with a preferred embodiment of the present invention.

Referring to FIG. 2, a block diagram depicts a data processing system, which may be implemented as a server, such as server 104 in FIG. 1, in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly. Server 104 also includes a printer adapter 234, which is connected to I/O bus 212. Printer adapter 234 provides a mechanism for communicating with a printer. Through printer adapter 234, server 104 may send various data for printing on a printer.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
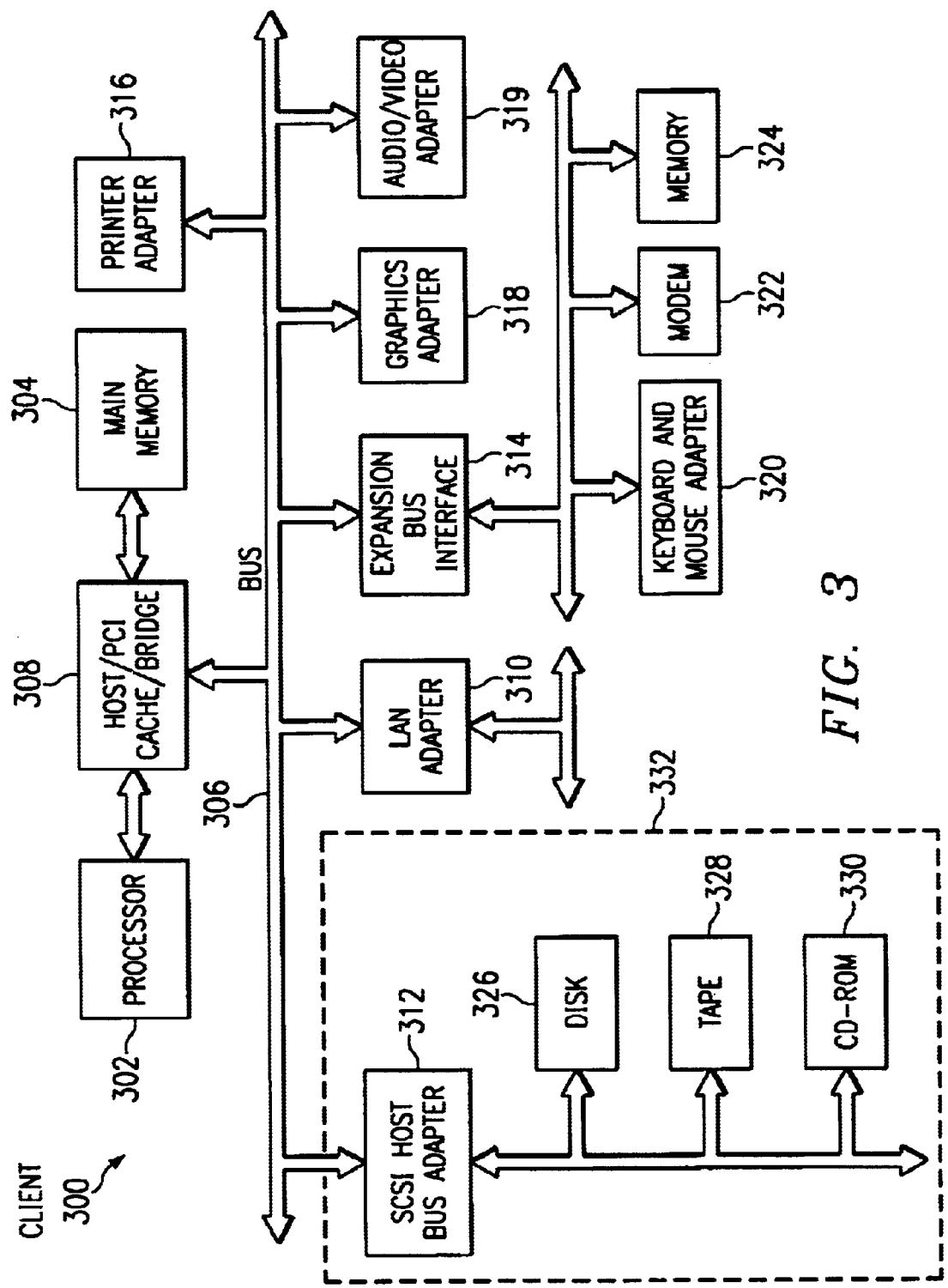
FIG. 3 is a block diagram which illustrates a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, printer adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations.

The present invention provides a method, apparatus, and instructions for controlling printing within a distributed data processing system. The present invention provides an improved mechanism for controlling printing through a single interface, such as a graphical user interface (GUI), to select and/or configure a font-matching scheme to enhance the quality and performance of printing, especially in Java environments. The present invention provides an ability to have multiple font-matching schemes per system and per device, which are features not presently available in known printing systems. The mechanism of the present invention provides an interface through which a user or administrator may select system and/or device fonts for use with logical fonts, such as Java logical fonts. A device font is the font that exists within the device hardware. The advantage of a device font is that it has a better quality and rendering time when compared to a system font. A system font is a font available in an operating system to be used for display or printing.

Figure 4:
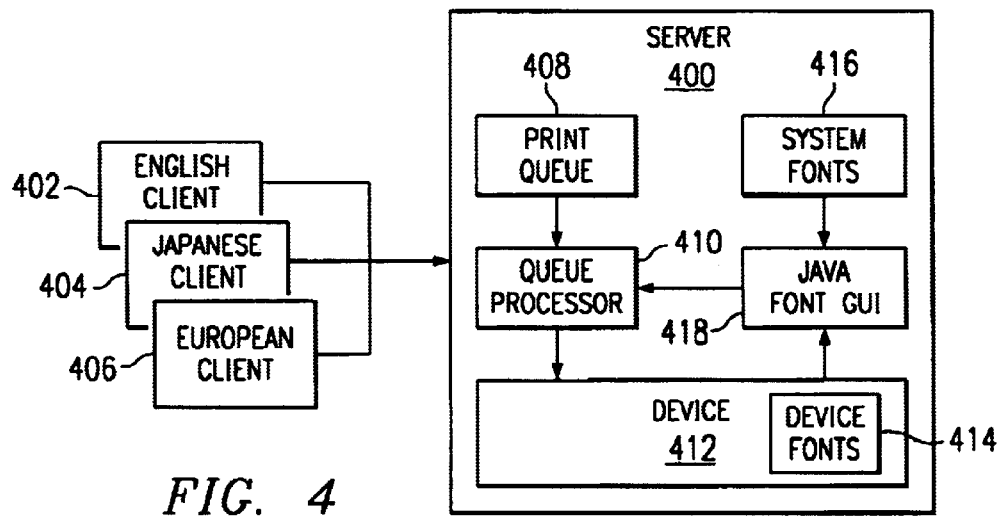
FIG. 4 is a block diagram of software components used to control printing within a distributed data processing system.

With reference now to FIG. 4, a block diagram of software components used to control printing within a distributed data processing system is depicted in accordance with a preferred embodiment of the present invention. Server 400 is a printer server, such as server 104 in FIG. 1. This server may receive print jobs from clients, such as clients 402, 404, and 406. These clients may be clients such as 108, 110, or 112 in FIG. 1. In particular, server 400 will receive print jobs from clients 402, 404, and 406. A print job is a request from a client to output to a particular hard copy device a set of graphical primitive commands. A print transaction is a form of a print job in which a location of commands for the print job is provided in the request to print the hard copy. These print jobs may be initiated from clients that differ in the language or locale. For example, client 402 uses English as the locale while Japanese is the locale for client 404. European is the locale for client 406 in the depicted example.

In accordance with the preferred embodiment of the present invention, server 400 includes the necessary software components to control printing from print jobs received from various clients. Server 400 includes a print queue 408, which is employed to receive and store print jobs for processing by print queue processor 410. Device driver 412 is used to generate the data stream for the printer. Device driver 412 also contains device fonts 414. Also included within server 400 is system fonts 416. Java font GUI 418 provides the interface that is used to create associations between system and device fonts to Java fonts. Although not shown, server 400 also may include other components used for printing data. Examples of other components include other server applications or other print queues located on the server.

Figure 5A:
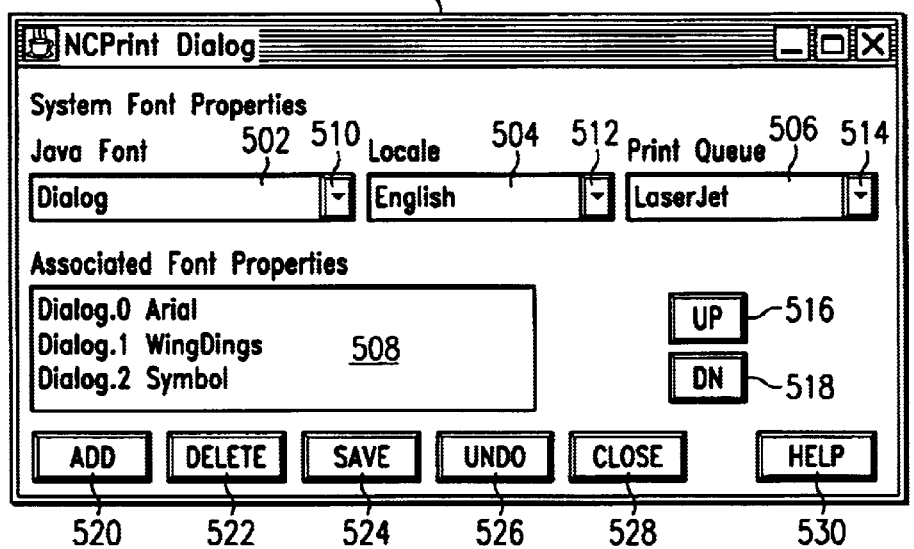
FIGS. 5A–5C are dialogs employed in a Java font graphical user interface in accordance with a preferred embodiment of the present invention.
Figure 5C:
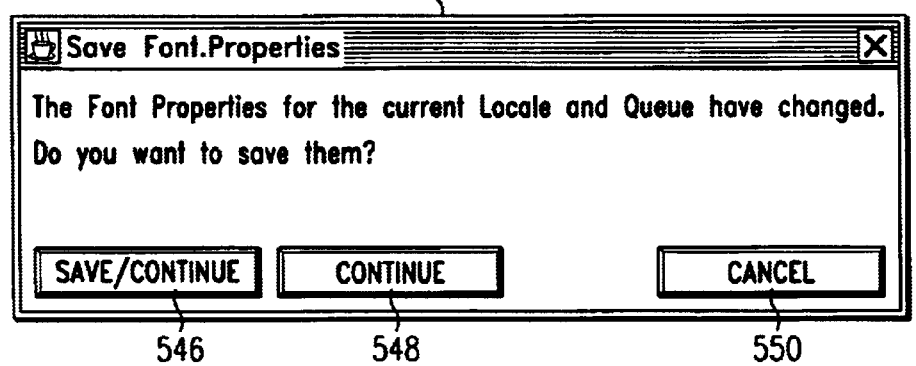
Figure 5B:
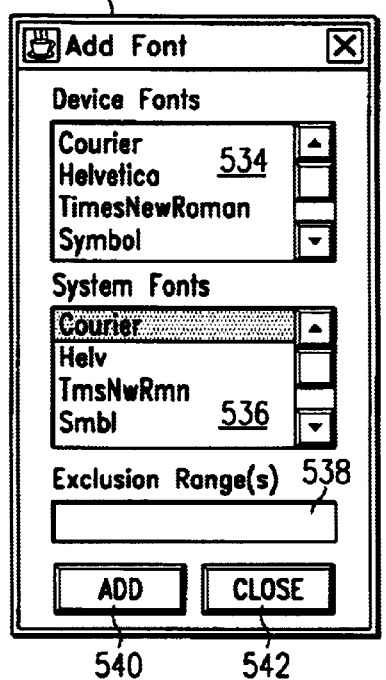

With reference now to FIGS. 5A–5C, dialogs employed in a Java font graphical user interface are depicted in accordance with a preferred embodiment of the present invention. These dialogs are dialogs that may be employed in a Java font GUI, such as Java font GUI 418 in FIG. 4. In FIG. 5A, dialog 500 is a print font dialog that is used to provide a user or administrator a mechanism to create and edit the default font-properties file based on print queue and locales on the server. The font-properties file contains Java logical font to system font mapping. Dialog 500 is employed by the user or administrator during print configuration in the depicted example. This dialog also may be used at a later time after a print queue has been added. Dialog 500 includes a Java logical font field 502, a locale field 504, and a queue 506. Dialog 500 also includes an associated font properties field 508. Selections for Java logical font field 502, locale field 504, and queue field 506 may be displaced through selecting controls 510, 512, and 514 respectively. Java logical font field 502 displays the Java logical fonts. Any time a new Java logical font is selected, the font list will display the new Java logical fonts with the respective system/device fonts and exclusion range(s). Locale field 504 displays the current Java supported locales. Anytime a locale is changed, Java font GUI will load a new font properties file based on the new locale. The user or administrator will be prompted with the save font dialog before switching font properties files. This dialog is shown in FIG. 5C and is described below.

Next, queue field 506 displays the current queues for printers that exist on the print server. In particular, the queue field displays queue fields that may be accessed for printing print jobs. Anytime the queue is changed the Java font GUI will load in a new font properties file based on the new queue. The user or administrator will then be prompted with the save font dialog as illustrated in FIG. 5C before switching font properties files.

Within associated font properties field 508, UP button 516 is used to move the currently selected list up in priority while down DN button 518 is used to move the currently selected list item down in priority. For example, if the entry "Dialog.1 Wingdings" in associated font properties field 508 is selected and UP button 516 is depressed that dialog will be moved in priority with respect to "Dialog.0 Arial".

ADD button 520 is used to initialize an add font dialog box for adding a new font as the last priority in the depicted example. This add font dialog is described in more detail below. In the depicted example, the add selection initiated by ADD button 520 is inactive as long as the add font dialog box is active. DELETE button 522 is used to delete the currently selected font. SAVE button 524 saves the current font properties file. Such a selection of this button will cause UNDO button 526 to become inactive. UNDO button 526 replaces the original values in the list from initialization or the last save. CLOSE button 528 is employed to close the font GUI without saving. HELP button 530 is employed to show help information on the currently selected control.

In FIG. 5B, the add font dialog 532 is illustrated. The add font dialog 532 includes a device fonts field 534, a systems font field 536, and an exclusion range(s) field 538. Add font dialog 532 allows a user or administrator to select system or device fonts for entry into a specific font properties file. The add font dialog will query for the default device being used and then will query the device for its list of device fonts. These device fonts are displayed within device fonts field 534. In addition, the Java font GUI will query for a list of system fonts and display these fonts within system fonts field 536. The query for both system and device fonts in the depicted example are made via a native library calling the native QueryFonts application interfaces. The user or administrator also may set the exclusion range(s) of the selected system/device font through exclusion range field 538. Add button 540 returns the font, system, or device information, and the exclusion range(s) to the Java font GUI main displays. Such a selection will not close add dialog box 532 because the user or administrator may want to add several fonts. Instead, the selection of close button 542 will close add dialog box 532 and reactivate add button 520 in dialog 500.

In FIG. 5C, a save font dialog 544 is depicted in accordance with a preferred embodiment of the present invention. Save font dialog 544 is presented any time Java font GUI has to switch font properties files based on a user or administrator's actions. This dialog allows a user or administrator the chance to save the current selections, continue without saving, or cancel the initial request. Saving current selections may be initiated through the selection of save/continue button 546 while the continuing without saving option may be initiated by selecting continue button 548. Canceling the initial request may be initiated through selecting cancel button 550. This dialog will not come up in the depicted example unless a change has been made to the original data.

Figure 6:
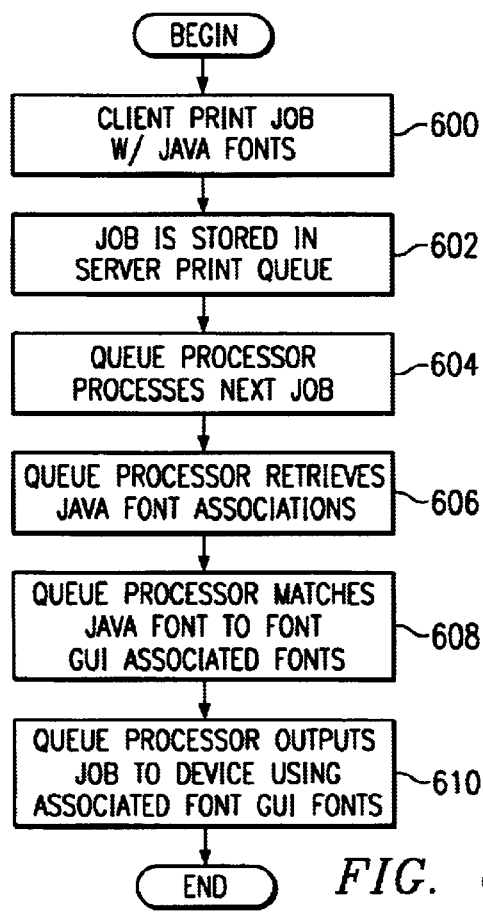
FIG. 6 is a high-level flowchart of a process employed by a server in processing print jobs from various clients in accordance with a preferred embodiment of the present invention.

With reference now to FIG. 6, a high-level flowchart of a process employed by a server in processing print jobs from various clients is depicted in accordance with the preferred embodiment of the present invention. This flowchart illustrates on a high level the steps used in printing data received in print jobs from various clients. The process begins by receiving a client print job containing Java fonts (step 600). These print jobs are received from various clients across a distributed data processing system. For example, print jobs may be received from clients, such as clients 402, 404, or 406 in FIG. 4. In step 602, the received print job is stored in a server print queue, such as print queue 408 in FIG. 4. A queue processor processes the next job (step 604). Print jobs are processed in a first-in first-out basis in the depicted example. The queue processor retrieves the Java font associations (step 606). These Java font associations are created and stored by an interface, such as Java font GUI 418 within server 400 in FIG. 4. The queue processor matches the Java font to the font GUI associated font (step 608). Thereafter, the queue processor outputs the print job to the device driver using the associated font GUI associated fonts (step 610) with the process terminating thereafter.

Figure 7:
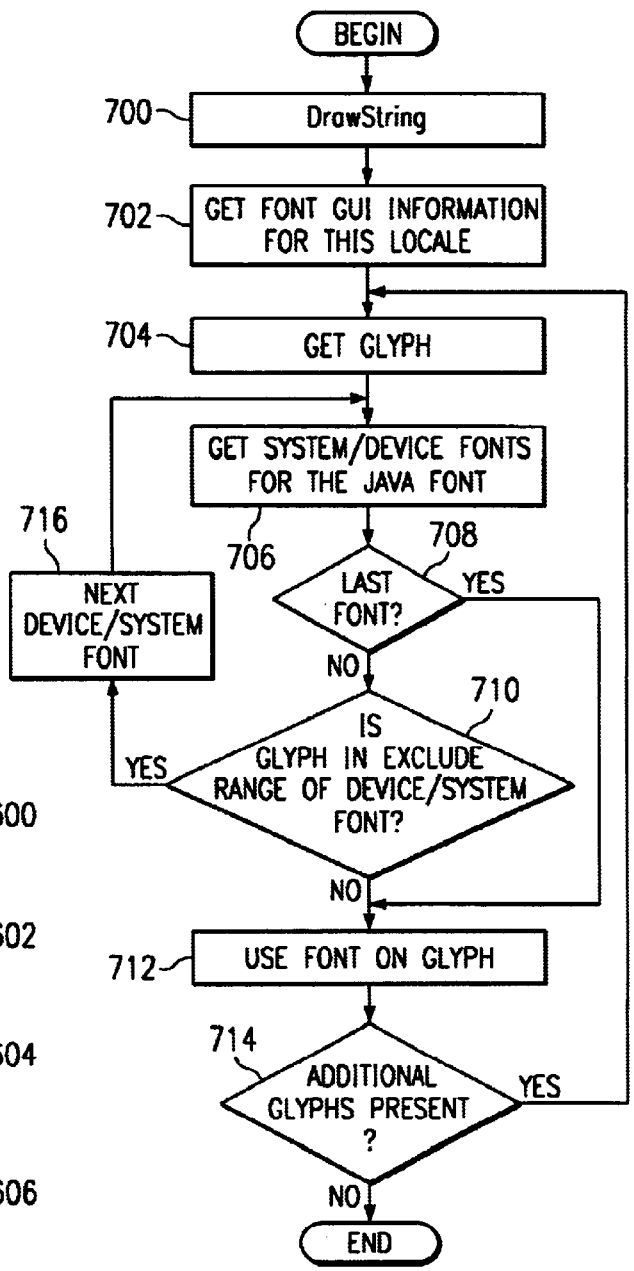
FIG. 7 is a flowchart of a process employed by a queue processor to match fonts in accordance with a preferred embodiment of the present invention.

With reference now to FIG. 7, a flowchart of a process employed by a queue processor to match fonts is depicted in accordance with the preferred embodiment of the present invention. The queue processor will match fonts in response to receiving a DrawString command (step 700). DrawString is a graphical primitive command to draw a string of glyphs using the currently selected font to the currently selected output device. In response to receiving a DrawString command, the process obtains the font GUI information for a particular locale also referred to as a language (step 702). The queue processor then obtains the glyph that is to be drawn or printed (step 704). This glyph is usually obtained by using a glyph ID associated with the glyph. A glyph is an image, usually of a character, in a font. A glyph is a graphic symbol whose appearance conveys information. Thereafter, the queue processor obtains the system/device fonts for the particular Java fonts (step 706). These fonts are processed or selected based on the order in which the fonts are listed or based on a priority associated with each font. These system and/or device fonts are obtained using the Java font GUI, such as Java font GUI 418 in FIG. 4. The Java font GUI is used to define a font.properties file for each locale and queue. The queue processor will retrieve fonts from the font.properties file. A determination is then made as to whether this is the last font (step 708). If this is not the last font and the association is retrieved from the Java font GUI, a determination is made as to whether the glyph is in an excluded range of the particular device/system font retrieved for this particular Java font (step 710). The Java font GUI 418, particular range(s) may be selected in which a glyph would not be printed using this particular font.

If the glyph is not in an excluded range for the device/system font, the font is used for the glyph (step 712). Thereafter, a determination is made as to whether a additional glyphs are present for printing (step 714). If no additional glyphs are present, the process terminates. Otherwise, the process returns to step 704 to obtain the next glyph.

With reference again to step 710, if the glyph to be printed is in the excluded range for the particular device/system font, the next device/system font is identified for this particular Java font (step 716). The process then returns to step 706 as described above.

With reference again to step 708, if the font is the last font, this font proceeds to step 712 as described above. Typically, the last font associated with the Java font in the depicted examples is one that contains a full set of glyphs for the Java font even if the typeface and style doesn't match. This is employed as a backup font in the depicted example.

Figure 8:
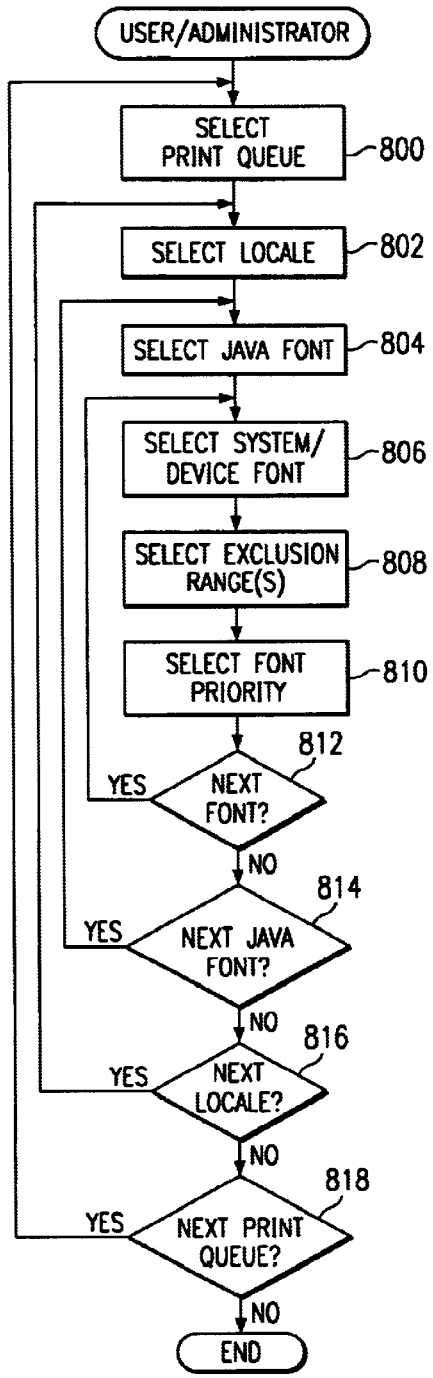
FIG. 8 is a flowchart of a process employed by a user of a Java font GUI in accordance with a preferred embodiment of the present invention.

Turning now to FIG. 8, a flowchart of a process employed by a user of a Java font GUI is depicted in accordance with a preferred embodiment of the present invention. The processes illustrated in FIG. 8 are used to select font associations for Java logical fonts with respect to system and /or device fonts. These steps may be implemented in conjunction with the display of dialogs to a user through the Java GUI, such as the dialogs illustrated in FIGS. 5A–5C.

The process in FIG. 8 begins by the user, who may be the administrator, selecting a print queue (step 800). Thereafter, a locale is selected (step 802). A Java font is then selected (step 804). Then the selection of a system/device font is made (step 806) along with the selection of exclusion range(s) (step 808). The font priority is then selected (step 810). A determination is then made as to whether another font is to be selected (step 812). If another font is to be selected, the process returns to step 806 for another selection of a device or system font. If another font is not to be selected, a determination is then made as to whether another Java font is to be selected (step 814). Upon selection of another Java font, the process returns to step 804 for selection of a Java font. Otherwise, a determination is made as to whether another locale is to be selected (step 816). If another locale is to be selected, the process returns to step 802. Otherwise, a determination is made as to whether another print queue is to be selected (step 818). If another print queue is to be selected, the process returns to step 800. Otherwise, the process terminates.

Figure 9:
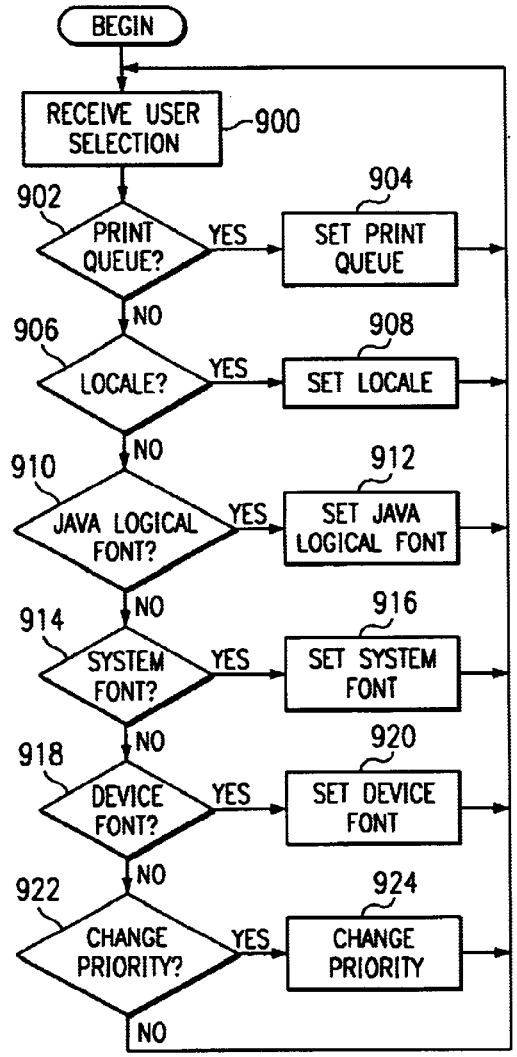
FIG. 9 is a flowchart of a process used by a Java font GUI to create a font properties file in accordance with a preferred embodiment of the present invention.

With reference now to FIG. 9, a flowchart of a process used by a Java font GUI to create a font properties file in accordance with a preferred embodiment of the present invention. The process begins by receiving a user selection (step 900). Thereafter, a determination is made as to whether the user has selected a print queue (step 902). If the user has selected a print queue, then the print queue is set based on the user's selection (step 904) with the process returning to step 900. In the depicted example, a print queue may be selected and set by creating or selecting a subdirectory associated with the print queue to store a font.properties file to be used with the print queue selected by the user.

If the user has not selected a print queue, then a determination is made as to whether the user has selected a locale (step 906). If the user has selected a locale, the locale is set using the user's selection (step 908) with the process returning to step 900 thereafter. A locale may be set by creating or selecting a font.properties file for the particular locale. If the user has not selected a locale, then a determination is made as to whether the user has selected a Java logical font (step 910). Selection of a Java logical font results in that font being set or placed within the font.properties file for the particular locale for a particular queue (step 912) with the process then returning to step 900. Otherwise, a determination is made as to whether a system font has been selected (step 914). If a system font has been selected, the system font is set or placed in the font.properties file in association with a selected Java logical font (step 916) with the process then returning to step 900.

If a system font has not been selected, a determination is made as to whether a device font has been selected by the user selection (step 918). If a device font has been selected, the device font is set or placed in the font.properties file in association with a selected Java logical font (step 920) with the process then returning to step 900. Otherwise, a determination is made as to whether the user has selected a priority (step 922). If the user has selected a priority for a selected font, the priority is changed for a selected font (step 924) with the process then returning to step 900. Otherwise, the user has made an unrecognized selection for this process with the process then retiring to step 900.

Figure 10:
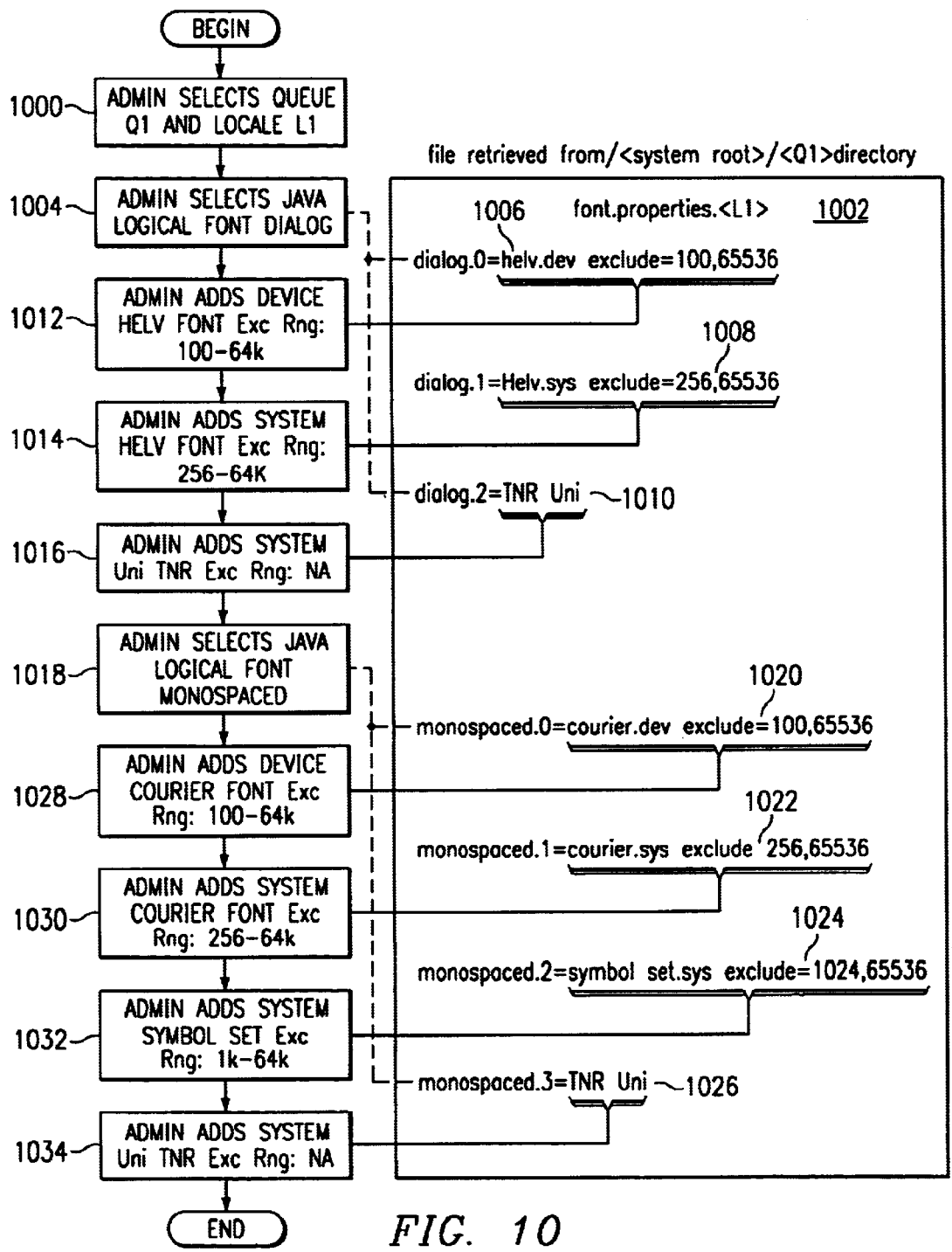
FIG. 10 is a flowchart and diagram illustrating creation of a font properties file in accordance with a preferred embodiment of the present invention.

With reference now to FIG. 10, a flowchart and diagram illustrating creating of a font properties file is depicted in accordance with a preferred embodiment of the present invention. Although the steps depicted in this figure are those made by an administrator, these selections may be made by other users. The process begins by selection of a queue Q1 and a locale L1 (step 1000). The selection of the queue Q1 and locale L1 results in a font properties file 1002 being retrieved from a subdirectory Q1 in which font.properties file 1002 is named font.properties.<L1>.

Next, a selection of a Java logical font named dialog is made (step 1004). The selection of the Java logical font named dialog results in entries, such as entries 1006–1010, being associated with the font dialog. In this example, these entries are associated with the font dialog by using the identifier dialog.0, dialog.1, and dialog.2, which are associated with entries 1006, 1008, and 1010, respectively. In this example, the font in entry 1006 is selected first when trying to match a device or system font with the logical font. The font in entry 1006 will not match the logical font if the glyph being printed falls within the exclusion range selected for the font. If the glyph falls within the exclusion range, entry 1008 is selected next to see if the font in this entry can be matched to the logical font. If the glyph also falls within the exclusion range for the font in entry 1008, the font in entry 1010 is then used. In this example, entry 1010 has no exclusion range and will be used if no other device or system font associated with the logical font matches the logical font.

In the depicted example, the device font Helvetica (Helv) is added in association with the logical font dialog having an exclusion range of 100 to 64 k (step 1012). This results in entry 1006 being created within font properties file 1002. This entry has the highest priority and is used first in attempting to match a device or system font to the selected logical font. Thereafter, a system font Helvetica (Helv) with an exclusion range of 256 to 64 k is added in association with the Java logical font dialog (step 1014). This results in entry 1008 being added to font properties file 1002. A system font TNR Uni with no exclusion range is added to font properties file 1002 in association with the Java logical font named dialog (step 1016). This steps results in entry 1010 being created within font properties file 1002.

Next, the Java logical font named monospaced is selected (step 1018). In response to selection of this logical font, any system or device fonts added will be associated with this logical font. In the depicted example, entries 1020–1026 are created. Entry 1020 is created when the device font named Courier is added with an exclusion range 100 to 64 k (step 1028). A system font named Courier is added with an exclusion range of 256 to 64 k (step 1030). Addition of this font results in entry 1022 being created within font properties file 1002. Next, a system font named symbol with an exclusion range of 1 k to 64 k is added (step 1032). This step results in creation of entry 1024. Thereafter, system font TNR Uni is added without an exclusion range (step 1034). This results in entry 1026 being created within font properties file 1002. In this example, entry 1020 has the highest priority and is used first in attempting to match a system or device font to the logical font named monospaced. Entry 1022 is used next if the font in entry 1020 cannot be matched with the logical font with entries 1024 and 1026 being used thereafter.

The depicted example shows the selection of system and device fonts for association with two Java logical fonts for a particular queue and locale. Of course additional Java logical fonts may be added to font properties file 1002 and other device and system fonts associated with these additional logical fonts. In addition, the priority or order in which the system and/or device fonts are associated with a logical font may be altered within a font properties file using the processes of the present invention.

Although in the depicted example, the interface allows for direct user input, in another embodiment, the interface of the present invention may be a set of application programming interfaces (APIs). These APIs may be used by a program or operating system to alter priorities of selected fonts or to add or delete fonts from the font properties file. These changes may be performed dynamically during program execution. For example, a program or operating system monitoring font usage may identify a first font located in cache memory that is similar to a second font in which both fonts are present in the font properties file, in which the second font has a higher priority than the first font. In this case, the program or operating system may use an API call to the mechanism of the present invention to change the priority to use the first font in the cache memory before the second font. Alternatively, the first font may not be selected for use in the font properties file while the second font has been selected for use. In this case, the program or operating system would add the first font to the font properties file through an API call Also, the user interface may be located remotely form the processes of the present invention. For example, the user interface may be located on a client machine with a user sending font changes and/or selections through the user interface via API calls to the processes of the present invention located on a server. Also the processes of the present invention may act on a configuration file to remotely install or change fonts in the font properties file located on a server. The changes to the font properties file also could be made using code that writes the data such that the font code reads this data in identifying which font to use to print a glyph.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although various processes illustrated in the flowcharts are described with respect to a particular component, these processes may be located elsewhere depending on the implementation. For example, in FIGS. 6 and 7, the processes are shown to be implemented in a queue processor. Also, the Java font GUI may be implemented in a client machine, which would facilitate printing using the processes of the present invention in a stand alone printer, such as printer 118 in FIG. 1. These processes could be implemented elsewhere, such as, for example, in a device driver. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for controlling printing, the method comprising the computer implemented steps of:
   presenting an interface, wherein the interface allows for association of a logical font with a number of nonlogical fonts on a per printer queue basis, wherein the nonlogical font comprises a number of device and system fonts; and
   responsive to a print request, printing the print request using the nonlogical font associated with the logical font for that print request,
   wherein each nonlogical font within the number of nonlogical fonts has a different priority level in which the different priority level is used to determine which nonlogical font is to be used to print the print request.

2. A method in a distributed data processing system for controlling printing, the method comprising the computer implemented steps of:
   presenting an interface, wherein the interface allows for association of a logical font with a number of nonlogical fonts on a per printer queue basis; and
   responsive to a print request, printing the print request using the nonlogical font associated with the logical font for that print request, wherein the nonlogical font comprises a number of system fonts and wherein each nonlogical font within the number of nonlogical fonts has a range of glyphs and wherein the interface allows for a portion of the range of glyphs to be excluded from a first nonlogical font within the number of nonlogical fonts such that a second nonlogical font having a lower priority without the portion of the glyphs being excluded is used for printing glyphs within that range.

3. A method in a distributed data processing system for controlling printing, the method comprising the computer implemented steps of:
   presenting an interface, wherein the interface allows for association of a logical font with a number of nonlogical fonts on a per printer queue basis; and
   responsive to a print request, printing the print request using the nonlogical font associated with the logical font for that print request, wherein the nonlogical font comprises a number of device and system fonts and wherein the step of printing comprises:
      responsive to receiving the print request, determining the number of nonlogical fonts associated with the logical font;
      selecting a first font from the number of nonlogical fonts, wherein the first font has a highest priority with respect to other fonts within the number of nonlogical fonts, wherein the first font is a selected font;
      obtaining a glyph from the print request;
      responsive to the glyph being within a range of glyphs excluded in the first font, selecting a second font from the number of nonlogical fonts, wherein the second font has a next highest priority, wherein the second font is a selected font; and
      printing the glyph using the selected font.

4. A data processing system for controlling printing, the data processing system comprising:
   presenting means for presenting an interface, wherein the interface allows for association of a logical font with a number of nonlogical fonts on a per printer queue basis, wherein the nonlogical font comprises a number of device and system fonts; and
   printing means, responsive to a print request, for printing the print request using the nonlogical font associated with the logical font for that print request,
   wherein each nonlogical font within the number of nonlogical fonts has a different priority level in which the different priority level is used to determine which nonlogical font is to be used to print the print request.

5. The data processing system of claim 4, wherein each nonlogical font within the number of nonlogical fonts has a range of glyphs and wherein the interface allows for a portion of the range of glyphs to be excluded from a first nonlogical font within the number of nonlogical fonts such that a second nonlogical font having a lower priority without the portion of the glyphs being excluded is used for printing glyphs within that range.

6. The data processing system of claim 5, wherein the step of printing comprises:

determining means, responsive to receiving the print request, for determining the number of nonlogical fonts associated with the logical font;

selecting means for selecting a font first from the number of nonlogical fonts, wherein the first font has a highest priority with respect to other fonts within the number of fonts, wherein the first font is a selected font;

obtaining means for obtaining a glyph from the print request;

selecting, means, responsive to the glyph being within a range of glyphs excluded in the first font, for selecting a second font from the number of nonlogical fonts, wherein the second font has a next highest priority, wherein the second font is a selected font; and printing means for printing the glyph using the selected font.

7. The data processing system of claim 6, wherein the glyph is obtained using a glyph identifier associated with the glyph.

8. A computer program product in a computer readable medium for controlling printing, the computer program product comprising:

first instructions for presenting an interface, wherein the interface allows for association of a logical font with a number of nonlogical fonts on a per printer queue basis, wherein the nonlogical font comprises a number of device and system fonts; and second instructions, responsive to a print request, for printing the print request using the nonlogical font associated with the logical font for that print request, wherein each nonlogical font within the number of nonlogical fonts has a different priority level in which the different priority level is used to determine which nonlogical font is to be used to print the print request.

9. A data processing system for controlling printing, the data processing system comprising:

means for presenting an interface, wherein the interface allows for association of a logical font with a number of nonlogical fonts on a per printer queue basis; and means, responsive to a print request, for printing the print request using the nonlogical font associated with the logical font for that print request, wherein the nonlogical font comprises a number of system fonts and wherein each nonlogical font within the number of nonlogical fonts has a range of glyphs and wherein the interface allows for a portion of the range of glyphs to be excluded from a first nonlogical font within the number of nonlogical fonts such that a second nonlogical font having a lower priority without the portion of the glyphs being excluded is used for printing glyphs within that range.

10. A computer program product in a computer readable medium for controlling printing, the computer program product comprising:

first instructions for presenting an interface, wherein the interface allows for association of a logical font with a number of nonlogical fonts on a per printer queue basis; and second instructions, responsive to a print request, for printing the print request using the nonlogical font associated with the logical font for that print request, wherein the nonlogical font comprises a number of system fonts and wherein each nonlogical font within the number of nonlogical fonts has a range of glyphs and wherein the interface allows for a portion of the range of glyphs to be excluded from a first nonlogical font within the number of nonlogical fonts such that a second nonlogical font having a lower priority without the portion of the glyphs being excluded is used for printing glyphs within that range.

11. A data processing system for controlling printing, the data processing system comprising:

means for presenting an interface, wherein the interface allows for association of a logical font with a number of nonlogical fonts on a per printer queue basis; and means, responsive to a print request, for printing the print request using the nonlogical font associated with the logical font for that print request, wherein the nonlogical font comprises a number of device and system fonts and wherein the printing means comprises:

means, responsive to receiving the print request, for determining the number of nonlogical fonts associated with the logical font;

means for selecting a first font from the number of nonlogical fonts, wherein the first font has a highest priority with respect to other fonts within the number of nonlogical fonts, wherein the first font is a selected font;

means for obtaining a glyph from the print request;

means, responsive to the glyph being within a range of glyphs excluded in the first font, for selecting a second font from the number of nonlogical fonts, wherein the second font has a next highest priority, wherein the second font is a selected font; and means for printing the glyph using the selected font.

12. A computer program product in a computer readable medium for controlling printing, the computer program product comprising:

first instructions for presenting an interface, wherein the interface allows for association of a logical font with a number of nonlogical fonts on a per printer queue basis; and second instructions, responsive to a print request, for printing the print request using the nonlogical font associated with the logical font for that print request, wherein the nonlogical font comprises a number of device and system fonts and wherein the printing instructions comprises:

third instructions, responsive to receiving the print request, for determining the number of nonlogical fonts associated with the logical font;

fourth instructions for selecting a first font from the number of nonlogical fonts, wherein the first font has a highest priority with respect to other fonts within the number of nonlogical fonts, wherein the first font is a selected font;

fifth instructions for obtaining a glyph from the print request;

sixth instructions, responsive to the glyph being within a range of glyphs excluded in the first font, for selecting a second font from the number of nonlogical fonts, wherein the second font has a next highest priority, wherein the second font is a selected font; and seventh instructions for printing the glyph using the selected font.

* * * * *